Oct. 5, 1937.  C. U. BUNDICK ET AL  2,094,581
APPARATUS FOR FEEDING MATERIAL
Filed Jan. 15, 1934   2 Sheets-Sheet 1

INVENTORS
CLARKSON U. BUNDICK
BARTON A. PROCTOR
BY
ATTORNEY

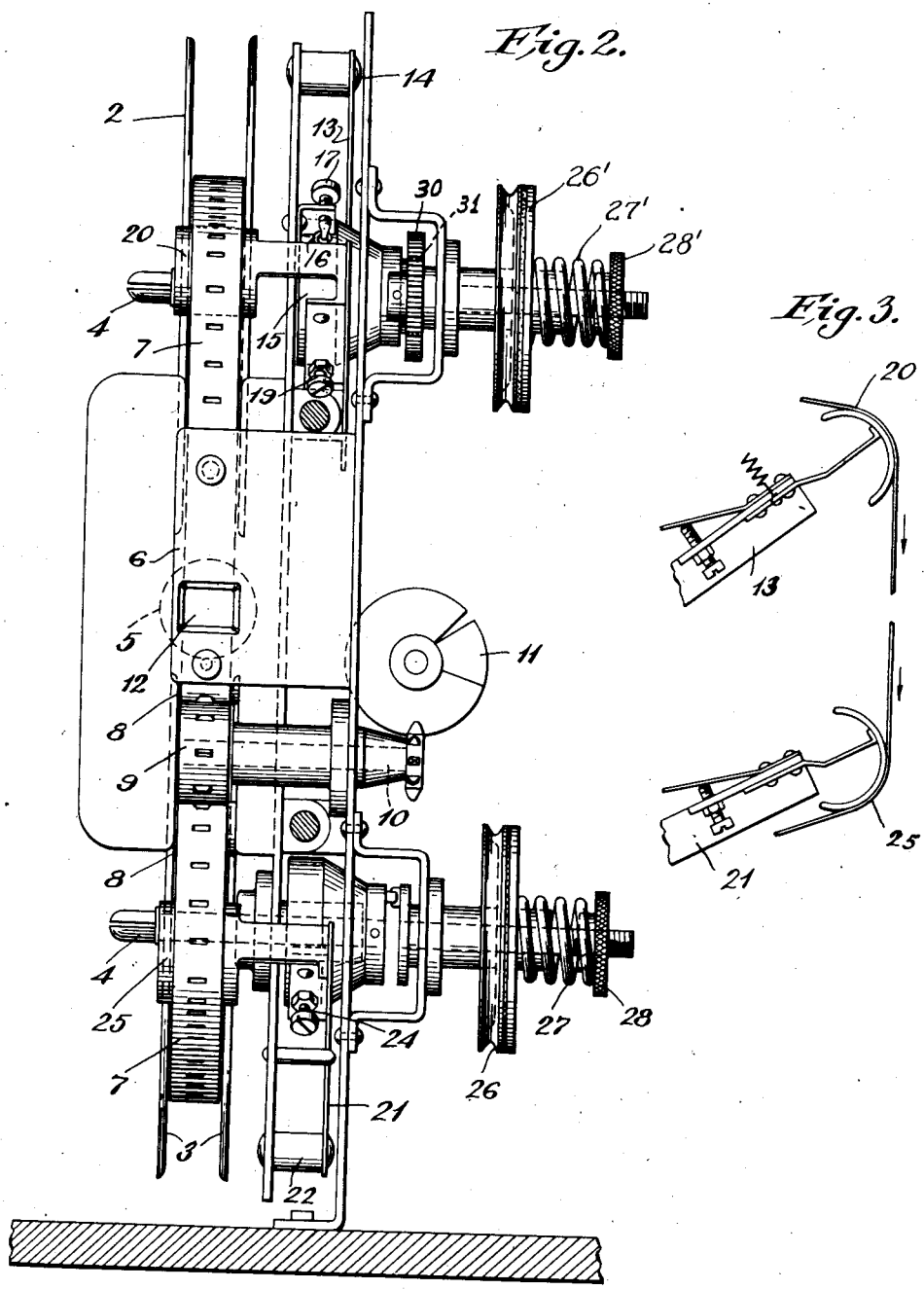

Patented Oct. 5, 1937

2,094,581

UNITED STATES PATENT OFFICE 2,094,581

APPARATUS FOR FEEDING MATERIAL

Clarkson Ulysses Bundick, White Plains, and Barton Allen Proctor, Larchmont, N. Y., assignors to Kinatome Patents Corporation, a corporation of New York Application January 15, 1934, Serial No. 706,760

16 Claims. (Cl. 88—17)

The present invention relates broadly to apparatus for feeding web or strip material, especially motion picture films, although the utility of our invention is not so limited.

This application is a continuation-in-part from our co-pending application, Serial Number 44,482, filed July 18, 1925, which upon January 16, 1934 matured as Patent Number 1,944,022.

In our parent application, film handling apparatus is disclosed and broadly claimed which so operates that the feeding of film is controlled by itself, the preliminary positioning of the film in the apparatus is much simplified, and its subsequent handling is much easier, simpler, and involves less likelihood of damage to the film than does the use of conventional film feeding means.

In our parent application, the claims are directed to an apparatus in which the film is preferably drawn from a revoluble film carrier which is revolved by the action of the film being unwound from the carrier. In our present application, claims are directed to the apparatus disclosed in our parent application arranged for having the supply carrier driven by suitable means in a way advantageously to cooperate with the action of the unwinding film.

An object of the present invention is to provide improved film feeding means which dispenses with conventional loops of unsupported slack, and has means for decreasing the tension on film being drawn from very large supply coils of film in accordance with teachings of our parent application.

For details of the operation of our device generically reference is hereby made to said copending parent application and to the several other co-pending applications belonging to the same assignee, namely: application Serial Number 187,980 of the applicant Proctor, filed April 30, 1927, and maturing upon January 16, 1934 as Patent Number 1,944,033, and/or to the co-pending application of the applicant Proctor, Serial Number 332,880, filed January 16, 1929, and maturing upon January 23, 1934, as Patent Number 1,944,036, said Patent Number 1,944,036 being a continuation in part of his Patent Number 1,894,963, dated January 24, 1933, and/or to the copending application of the applicant Proctor maturing upon January 16, 1934, as Patent Number 1,944,035.

In the accompanying drawings there is shown for purposes of illustration only, a preferred embodiment of the present invention, it being understood that the drawings do not define the limits of our invention as changes in the construction and operation disclosed therein may be made without departing from the spirit of the invention or the scope of our broader claims.

In the drawings:

Figure 2 is a front view of the construction illustrated in Figure 1.

Figure 3 is a side view of means for yieldingly mounting the film guides upon the outer ends of the supports.

Figure 1:
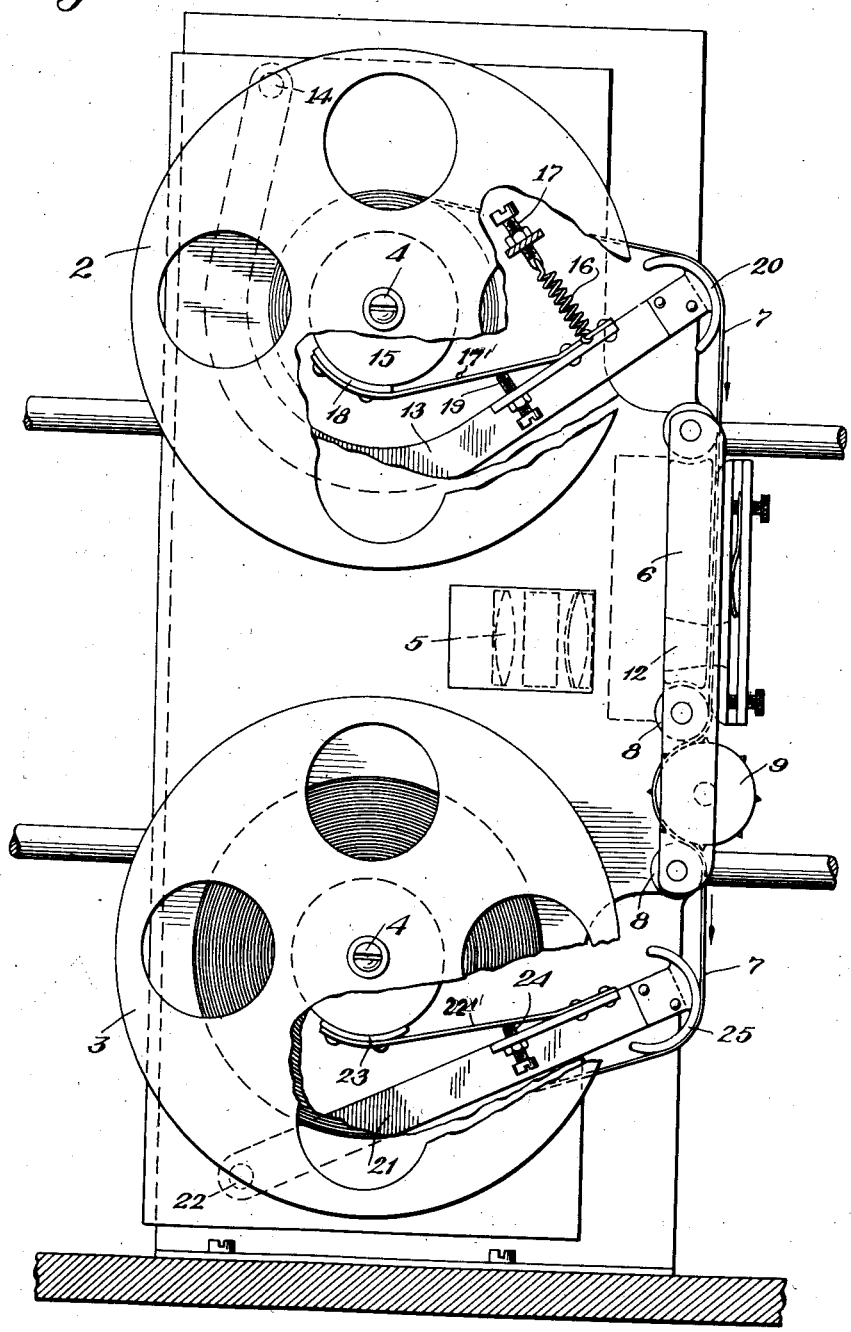
Figure 1 is a side elevational view, partly broken away and largely diagrammatic, illustrating one embodiment of the present invention.

The present invention, as already pointed out, is not limited in its utility to the feeding of any particular material, although it is of decided importance in connection with the feeding of film, due to the necessity of obtaining accurate registration of successive pictures and due also to the frangible nature of the film and the necessity of so feeding it as to prevent the possibility of rupture. As applicable to the photographic art, the invention is not limited to any particular form of projecting or photographing apparatus, and the drawings accompanying this specification are merely for the purpose of illustrating an operative embodiment of the invention.

In carrying out the present invention in connection, for example, with the feeding of film, there may be provided an apparatus comprising a feeding reel 2 and a take-up reel 3, the reels being mounted for rotation on suitable spindles 4.

Located at a suitable point, preferably intermediate the reels, is any usual arrangement of lenses 5 in line with a gate 6 through which the material, herein illustrated as comprising a film 7, is threaded. The gate is conveniently provided with guiding wheels 8 over which the film passes. Preferably the gate is of sectional construction, one section carrying the wheels 8 and a portion of the gate, and the other section carrying the remainder of the gate and the intermittently rotating film feeding wheel 9. The wheel 9 in accordance with common practice may be secured to a shaft 10. The opposite end 7 cooperates with a driving means 11 of the character adapted to intermittently rotate the wheel, as well as understood in the art. As the feed wheel 9 intermittently rotates it feeds intermittently successive sections of the film past an aperture 12, whereby the portions of the film are successively exposed.

Cooperating with the feed reel is a braking and tensioning mechanism preferably comprising a supporting arm 13 having a pivotal mounting 14, the support preferably surrounding a substantial part of a drum 15 on the feeding reel. This support is normally urged upwardly, as shown in the drawings, in a counterclockwise direction by a spring 16 cooperating at one end with means 17 for adjustably varying the tension of the spring. Carried by the support as upon a flat spring 17' is a brake shoe 18 having a suitable friction surface bearing against the drum 15, the normal pressure being adjustable in part by a stop 19 in combination with the adjustment 17. The outer end of the support may be very yieldingly or rigidly mounted thereon, and conveniently comprises a curved guide 20 over which the film is adapted to pass. The feed reel may be driven in any desired manner, as continuously, but the driving is preferably accompanied by means of a friction drive 26' adjustably controlled by means of a spring 27' and a nut 28' whereby the maximum driving force may be definitely limited. The above described friction drive may transmit power to the spindle through gears 30 and 31.

Cooperating with the lower reel 3 is a second braking and tensioning mechanism comprising a support 21 having a pivotal mounting 22 and as upon a flat spring 22' carrying a brake shoe 23. This brake shoe, like the shoe 18, cooperates with an adjustable stop 24. The outer end of the support 21 is also provided with either yieldingly or a rigidly mounted film guide 25 over which the film must pass in its travel to the take-up reel.

The take-up reel may be driven in any desired manner, but the driving is preferably accomplished by means of a friction drive 26, adjustably controlled by means of a spring 27 and a nut 28, whereby the maximum driving force may be definitely limited.

The friction drives 26 and 26' may be powered by any desired means. Both of these driving means may be revolved at a speed greater than that of the sprocket 9, the compensation for this difference being secured by the braking elements and friction drives herein described.

The curved film guides 20 may be very yieldingly mounted upon the arms 13 and 21 in any desired manner. For purposes of illustration only, Figure 3 of the drawings shows one such manner. The film guides 20 may be attached to their respective arms as by flat springs as illustrated in Figure 3.

In actual operation the feeding of the film in the direction indicated by the arrow in Figure 1 will be effective for pulling the support 13 downwardly against the action of the spring 16 to thereby slightly release the brake and permit the film to unwind therefrom. The brake, however, is preferably never completely disengaged from the drum 15, the upper reel thereby being always maintained under a slight braking pressure effective for preventing over-running thereof. This increase in braking pressure in operation tends to lessen the effectiveness of the friction drive, and consequently the amount of film delivered by the feed reel in response to the pull of the intermittent feed wheel or sprocket 9. This is highly desirable, as it prevents the formation of any amount of slack, and consequently maintains more nearly uniform conditions of tension and feed.

The action of the lower braking and tensioning mechanism is preferably such as to counteract the pull of the friction drive. In other words, the greater the driving force required by reason of tension on the film, the greater will be the friction exerted by the brake shoe 23, for the reason that the tension on the film will be increased, thereby tending to move the support 21 upwardly, as shown in the drawings, in a counterclockwise direction about its pivotal mounting, thereby causing the brake shoe 23 to bear more tightly against its braking surface. This increase in braking pressure in operation tends to lessen the effectiveness of the friction drive, and consequently the pull against the intermittent feed wheel or sprocket 9. In actual practice this mechanism has been found to accomplish a very decided improvement in registration at the aperture 12. It will be understood by those skilled in the art that the present apparatus provides a decidedly effective means of automatically maintaining the desired tension in a length of material by the material itself. As the amount of tension becomes too great, the pull of the material intermediate the two carriers will be increased, thereby decreasing the resistance to rotation on the delivering carrier, making the delivery of material easier in order to restore the desired tension conditions. At the same time such an increase in tension will serve to counteract to a desirable extent the force of the driving mechanism, whereby the material will not be subjected at any time to undue strain.

It will be realized that the invention is further of particular importance in connection with the motion picture industry; for example, wherein there is utilized apparatus embodying a gate through which the material must be fed, and particularly a sectional gate. This is true for the reason that by the use of a sectional gate the initial feeding of the film is expedited and by reason of the automatic control for the tension any manual adjustment is obviated.

To summarize the operation of the feeding apparatus: As the sprocket 9 revolves, the arm 13 is depressed and energy is stored in the spring 16. While the sprocket 9 is at rest, the spring 16 pulls the arm 13 upwardly, thereby causing an amount of film 7 to be pulled from the reel 2. Upon the next rotation of the sprocket 9, the film 7 is again moved downwardly, the portion necessary to compensate for this displacement being the amount of film previously pulled outwardly from the reel 2, and that which is at that moment pulled off of the reel 2. This downward movement of film 7 again moves the arm 13, stores up power in spring 16 which is used during the next period of rest of the sprocket 9 to pull more film from the reel 2, and that cycle is repeated throughout the entire period of operation. The feeding reel 2 may be driven to assist in this operation, as is clearly shown in Figure 2, and to relieve the film from at least a portion of the drag as of a heavily loaded feeding reel. In such case, it will be evident to those skilled in the art that the frictional drive of the feeding reel may be at a rate less than that of the drive of the sprocket 9.

The flat spring 22' acts both as a support for the braking pad 23 and also, in a manner analogous to that of the coiled spring 16, to thrust the film contacting member 25 forwardly thus keeping it in constant contact with the bight in the film between the intermittent feeding member 9 and the take-up carrier 3. As the sprocket 9 revolves, thereby increasing this bight, the action of the spring 22' moves the film contacting surface 25 downwardly thus preventing the formation of unsupported slack. The continued powered revolution of the carrier 3 tends to shorten the bight in the film and place the flat spring 22' under increasing tension in preparation for the next revolution of the intermittent feeding sprocket 9.

As the result of the operation heretofore described, the delivery carrier and the take-up carrier operate continuously, but at rates of speed which vary in step with the intermittent operation of sprocket 9, and all of the material between the carriers is continuously maintained at substantially constant tension. As previously pointed out, the braking function of these auxiliary feeding mechanisms is useful, particularly when abnormal conditions of feeding arise, but is not necessary in all cases to the maintenance of the constant tension of the film or to the auxiliary feeding operation above described. It will be noted by those skilled in the art that if the frictional drive of the feeding reel is at a rate less than that of the sprocket 9, the operation of the brake 18 will have the effect of preventing the previously mentioned over-running of the film.

The advantages of the present invention arise from the provision of means for maintaining a braking pressure on a delivery carrier, thereby maintaining more nearly uniform and effective conditions of tension on the material and preventing over-running of the material from the delivery or feeding carrier.

Still other advantages of the invention arise from the provision of means cooperating with the take-up carrier, whereby the pull exerted through the driving mechanism is not transmitted in full and unregulated to the material or to the feeding mechanism.

Still further advantages arise from a mechanism of the character referred to as applied to the motion picture industry or to the feeding of sensitized or photographic film in that it serves to decrease pull on the feeding sprocket and thereby insure more accurate registration of successive exposures at the gate aperture.

Additional advantages arise from the provision of auxiliary feeding means operated by the film itself which, without any preliminary manipulation by the operator, are effective for compensating for the differences in characteristics of movement of the intermittent feeding member at the aperture, the delivery reel and the continuously driven take-up reel, while maintaining the entire operative length of the film under substantially constant tension and minimizing the strain and wear thereupon.

Other advantages arise from the cooperation of the continuously operating driving means for the feeding reel with the intermittent sprocket in advancing the film without loops of slack and with a minimum tension being brought upon the film.

We claim:

1. In a film handling apparatus, a feeding reel, a take-up reel, a gate therebetween, a bight of film extending from each reel to the gate, two movable film guides each having a curved surface which engages one of the bights of the film between the gate and the appropriate reel, one leg of the film extending in a direct line from the curved surface of each guide to its relatively adjacent reel while the other leg of said film extends in a direct line from said curved surface to the gate, feeding means for intermittently drawing the film from one feeding reel through the gate and advancing it toward the other reel, spring means for thrusting each of said guides forwardly toward the film to tension the film during each operation of said intermittent feeding means, and powered mechanism for continuously driving each of said reels in a feeding direction at such a rate that the film is continuously maintained in operative relation with the said curved surface of the film guide associated with said reel.

2. In a film handling apparatus, a delivery carrier and a take-up carrier, a gate between said carriers, a first bight of the film extending between said delivery carrier and said gate, a first film guide having a curved surface continuously engaging the film in said first bight, one leg of the film of said first bight extending in a direct line from the curved surface of said first guide to the delivery carrier while the other leg extends in a direct line from said first surface to said gate, a second bight of the film extending between said gate and said take-up carrier, a second film guide having a curved surface constantly engaging the film in said second bight, one leg of the film of said second bight extending in a direct line from the gate to the curved surface of said second guide and the other leg of said bight extending in a direct line from said curved surface to said take-up carrier, means for intermittently pulling the film directly from said delivery carrier and advancing it toward said take-up carrier thereby decreasing said first bight and increasing said second bight, means operative in step with each such intermittent feeding operation for thrusting said first guide forward toward the film to increase the length of both legs of said first bight, means operative in step with each such intermittent feeding operation to urge said second guide forward toward the film to maintain said bight under tension, powered mechanism for driving each of said carriers continuously and in a feeding direction, and yielding means for transmitting the power of said mechanism to each of said carriers, said mechanism and said transmitting means being effective to drive said carriers at such a rate that each of said guides is maintained in operative relation with the film during each such intermittent feeding operation.

3. In a film handling apparatus, a delivery carrier and a take-up carrier, a gate therebetween, a first bight of the film extending between said delivery carrier and said gate, a first film guide having a curved surface continuously engaging the film in said first bight, one leg of the film of said first bight extending in a direct line from the curved surface of said first guide to the delivery carrier while the other leg extends in a direct line from said curved surface to said gate, a second bight of the film extending between said gate and said take-up carrier, a second film guide having a curved surface constantly engaging the film in said second bight, one leg of the film of said second bight extending in a direct line from the gate to the curved surface of said second guide and the other leg of said bight extending in a direct line from said curved surface to said take-up carrier, means including a toothed feeding member for intermittently pulling the film directly from said driven delivery carrier and advancing it toward said take-up carrier thereby decreasing said first bight and tending to increase said second bight, a first means operative after each such intermittent feeding movement for thrusting said first guide forwardly toward the film to increase the length of both legs of said first bight in preparation for the next intermittent feeding movement, a second means operative after each such intermittent feeding movement for urging said second guide forwardly toward the film in opposition to the operation of said driven take-up carrier so that the continued operation of said take-up carrier during the inactivity of said intermittent feeding means does not pull the film directly against the teeth of said feeding member, powered mechanism for driving each of said carriers continuously and in a feeding direction, and yielding means for transmitting the power of said mechanism to each of said carriers, said mechanism and said transmitting means being effective to drive said carriers at such a rate that each of said guides is maintained in operative relation with the film during each such intermittent feeding operation.

4. In a film handling apparatus, a delivery carrier, powered mechanism for continuously and yieldingly driving said delivery carrier in a feeding direction, a gate, a bight of the film extending between said delivery carrier and said gate, a movable film guide having a curved surface engaging the film in said bight, one leg of the film in said bight extending in a direct line from the curved surface of said first guide to said delivery carrier while the other leg extends in a direct line from said curved surface to said gate, means for intermittently drawing the film directly from said delivery carrier and through said gate thereby decreasing said bight, and means operative after each such intermittent feeding movement for thrusting said guide forwardly toward the film to increase the length of both legs of said bight, said thrusting means being effective to move said guide with sufficient rapidity and said mechanism driving said delivery carrier at a rate effective to prevent the advancement of the film by said driven carrier sufficiently rapidly to cause slack in the film.

5. In a film handling apparatus, a delivery carrier, an apertured gate, film supporting devices establishing a bight in the section of the film extending between said delivery carrier and said gate, an intermittent feed for drawing the film away from said delivery carrier and through said gate past the aperture thereof, resiliently operated mechanism including a member contacting the film in said bight for supporting and tensioning the film during each operation of said intermittent feed, and means for driving said delivery reel in a feeding direction at such rate that said film contacting member continuously remains in operative relation with the film.

6. In a film handling apparatus, a delivery reel, powered mechanism for continuously driving said delivery reel in a feeding direction, an intermittent pulldown mechanism, a spring pressed arm engaging and forming bight in a film between said reel and said pulldown, the pulldown being operative to advance the film intermittently and thus intermittently to reduce the size of the bight and move the arm against its spring tension, and the arm being operative to restore the bight to a predetermined size between each of such movements, the spring tension of the arm being so proportioned with respect to the speed of the reel and to the speed and force of the pulldown that the film is advanced continuously from the reel.

7. In a film handling apparatus, a delivery carrier, a take-up carrier, powered mechanism for continuously driving each of said carriers in a feeding direction, a yielding transmission between said powered mechanism and each of said carriers, an intermittently operating toothed feeding member positioned between said carriers for drawing film directly from said delivery carrier and moving it toward said take-up carrier, and mechanism for compensating for the difference in character of movement of said carriers and said feeding member; said compensating mechanism associated with said delivery carrier including a spring pressed movable member engaging the film and forming a bight therein between said delivery carrier and said intermittent feeding member, the film feeding member being operative to pull the film intermittently directly from said delivery carrier thereby tending to move it more rapidly than it is moved by the driving mechanism associated therewith and thus intermittently reducing the size of the bight and moving the spring member against its tension and the spring member being operative to restore the bight to a predetermined size between each of such movements, the spring tension of the member being so proportioned with respect to the speed of the carrier and the speed and force of the feeding member that the film is withdrawn continuously from said carrier and said member maintained continuously in operative relation with the film; and said compensating mechanism associated with said take-up carrier including a spring pressed member engaging the film and forming a bight therein between said feeding member and said take-up member, the spring pressed member being continuously pressed against the film under the influence of its spring and thus being effective during each period of operation of said feeding member to increase the size of the bight as the film is advanced to it by said feeding member and the continuously driven take-up carrier being operative during each period of idleness of said intermittent feeding member to reduce the size of the bight against the tension of the spring, the spring tension of said spring pressed movable member associated with said take-up carrier being so proportioned in respect to the force and speed of the continuously driven take-up carrier and the frequency and speed of operation of said intermittent feeding member that the film is wound continuously upon said take-up carrier.

8. In a film handling apparatus, a delivery reel, a take-up reel, powered mechanism for driving both of said reels in a feeding direction, an intermittent pulldown mechanism, a first spring pressed arm engaging the film and forming a first bight in the film between said delivery reel and said pulldown, a second spring pressed arm engaging the film and forming a second bight in the film between said pulldown and said take-up reel, the pulldown being operative to advance the film intermittently from the delivery reel and thus reduce the size of the first bight and increase the size of the second bight, the spring tension of the first arm being so proportioned with respect to the speed of the delivery reel and the arm remains constantly in contact with the film and the speed and force of the pulldown that the film is withdrawn continuously from the delivery reel and the arm maintained in continuous engagement with the film, and the spring tension of the second arm being so proportioned with respect to the speed and force of the take-up reel and the speed and frequency of the pulldown that the film is wound continuously upon the take-up reel and the arm maintained in continuous engagement with the film.

9. In a film handling apparatus, in combination, a rotatable delivery carrier, an intermittent feeding member for advancing a film from said rotatable delivery carrier, a reciprocable auxiliary film feeding member mounted to engage the film in a bight thereof between said intermittent member and said carrier, operative movement of said intermittent feeding member for feeding the film being effective to move said auxiliary member toward said intermittent member and partly straighten out said bight and to draw film from said delivery carrier, resilient means for resisting the movement of said auxiliary member toward said intermittent member, said resilient means being powered to move said auxiliary feeding member to re-establish said bight in the film at such speed as to reach the end of its reciprocable travel away from said intermittent member approximately at the beginning of the advance of the film by the next succeeding feeding movement of said intermittent member, a powered drive for yieldingly rotating said delivery carrier in a feeding direction at a rate less than the rate of movement of the film by said intermittent feeding member, whereby the film is continuously moved from said carrier, partly by said intermittent feeding member, partly by said auxiliary feeding member, and partly by said drive.

10. In a film handling apparatus, a delivery spindle adapted for the removable mounting of a carrier thereupon, an intermittent feed for advancing the film directly from said carrier, a resilient member continuously engaging the film between said feed and said spindle for maintaining the film under resilient tension, a powered drive for continuously operating said delivery spindle in a feeding direction at a speed no greater than that of the advance of the film by said intermittent feed, and a yielding transmission between said powered drive and said delivery spindle, said powered drive being effective to assist in the advance of the film toward said intermittent feed thereby tending to overcome the inertia of the carrier, said yielding transmission being effective to permit said intermittent feed to revolve said carrier faster than does said drive, and said resilient member being effective to maintain the film constantly in motion and under tension thereby preventing shock to the film and assisting in preventing the formation of slack.

11. In a film handling apparatus, a delivery spindle adapted for the removable mounting of a carrier thereupon, an intermittent pull-down for drawing the film directly from said carrier, powered mechanism for continuously driving said delivery spindle at a rate no greater than that at which the film is being withdrawn therefrom by said intermittent pull-down, a resilient coupling between said powered mechanism and said delivery spindle, and a spring pressed tensioning member engaging the film between the delivery carrier and said intermittent pull-down, the tension of the spring of said member bearing such relation to the rate of drive of the delivery spindle and the rate of movement of the pull-down that slack does not occur in the section of the film between the carrier and said pull-down.

12. In a film handling apparatus, a spindle upon which a delivery carrier may be mounted, an intermittent feed for withdrawing the film supported by said delivery carrier directly therefrom and advancing it in a feeding direction, a drive for continuously revolving said delivery carrier in a feeding direction for moving the film toward said intermittent feed, a yielding transmission between said drive and said carrier, a brake for said spindle, a member engaging the film between said carrier and said intermittent feed, and a connection for operating said brake by said film engaging member for retarding the rate of rotation of said spindle under the influence of said yielding drive so that slack does not accumulate between said carrier and said intermittent feed.

13. In a film handling apparatus, a spindle upon which a delivery carrier may be mounted, feeding means for withdrawing film directly from said delivery carrier and advancing it in a feeding direction, a continuously operating drive for revolving said delivery carrier in a feeding direction for moving the film supported thereby toward said feeding means, a yelding transmission between said drive and said carrier, a brake operated by the film for preventing said drive from revolving said delivery carrier at such speed that the film is moved away from the carrier faster than it is advanced by said feeding means, and a tension controlling device engaging the film between said carrier and said feeding means for preventing shocks thereto and assisting said braking means in the prevention of the formation of slack.

14. In a film handling apparatus, in combination, a rotatable supply spindle carrying a coil of film, powered driving means for driving said spindle in a feeding direction, a slip clutch for transmitting the power of said driving means to said spindle, a brake drum on said spindle, intermittent film feeding means, a spring loaded member engaging the film between said intermittent means and said spindle, a brake shoe on said member arranged for engaging said drum in accordance with predetermined movement of the film by said spring loaded member, the film moving action of said spring loaded member cooperating with the intermittent film movement by said feeding means and the rate of movement of the film by said driven delivery reel for compensating for the difference in the character of the movement of the film by said feeding means and said spindle and preventing excess tension or slack in the film.

15. In a film handling apparatus, a supply carrier, powered means for yieldingly driving said supply carrier in a feeding direction, a gate, means for feeding film supported by said carrier through said gate faster than the peripheral speed of the coil of film on said carrier as rotated by said yielding drive, and means operated by the film for controlling the rate of rotation of said carrier, said means including a resilient member engaging the film between said carrier and said gate, a pivoted member upon which said film engaging member is mounted, a spring adapted to move said pivoted member in opposition to the action of the film when the film is moved by said feeding means, and braking means mounted upon and bodily movable with said pivoted member and effective to cooperate with said carrier upon the movement of said pivoted member by the action of said spring whereby the rate of rotation of said carrier is decreased upon movement thereof by said spring.

16. In a film handling apparatus, a delivery spindle upon which a carrier may be mounted, a drive for revolving said delivery spindle in a feeding direction, a yielding transmission between said drive and said carrier, feeding means for withdrawing the film directly from said carrier, and means operated by the film for controlling the rate of rotation of said carrier, said means including a guide engaging the film between said carrier and said feeding means, a pivoted member upon which said guide is mounted, a spring adapted to move said pivoted member in opposition to the action of the film when the film is moved by said feeding means and to hold said guide in continuous operative relation to the film, a brake drum attached to said spindle and revoluble therewith, and braking means mounted upon said movable member for movement therewith and effective to cooperate with said drum upon the movement of said movable member by the action of said spring whereby the rate of rotation of said spindle and said carrier mounted thereupon is controlled.

CLARKSON ULYSSES BUNDICK.
BARTON ALLEN PROCTOR.